US006370657B1

(12) United States Patent
Jansen et al.

(10) Patent No.: US 6,370,657 B1
(45) Date of Patent: Apr. 9, 2002

(54) HOT PROCESSOR SWAP IN A MULTIPROCESSOR PERSONAL COMPUTER SYSTEM

(75) Inventors: Kenneth A. Jansen, Spring; Sompong P. Olarig, Cypress; John E. Jenne, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/196,264

(22) Filed: Nov. 19, 1998

(51) Int. Cl.[7] .............................................. G06F 11/00
(52) U.S. Cl. ......................................... 714/23; 714/43
(58) Field of Search ............................. 714/23, 25, 27, 714/31, 37, 38, 43, 44, 48, 2, 6, 7, 8, 11, 24, 39, 15; 710/15, 17, 18, 48; 709/105, 201

(56) References Cited

U.S. PATENT DOCUMENTS

| 4,589,066 | A | * | 5/1986 | Lam et al. .................... 364/200 |
| 5,325,490 | A | * | 6/1994 | Brasseur ...................... 395/325 |
| 5,355,471 | A | * | 10/1994 | Weight ........................ 395/575 |
| 5,390,324 | A |   | 2/1995 | Burckhartt et al. .......... 395/575 |
| 5,461,266 | A | * | 10/1995 | Koreeda et al. ............. 307/125 |
| 5,596,711 | A |   | 1/1997 | Burckhartt et al. ..... 395/182.21 |
| 5,623,677 | A | * | 4/1997 | Townsley et al. ........... 395/750 |
| 5,627,962 | A |   | 5/1997 | Goodrum et al. ....... 395/182.11 |
| 5,652,833 | A |   | 7/1997 | Takizawa et al. ...... 395/182.08 |
| 5,696,895 | A |   | 12/1997 | Hemphill et al. ...... 395/182.02 |
| 5,737,604 | A |   | 4/1998 | Miller et al. ................. 395/651 |
| 5,764,882 | A |   | 6/1998 | Shingo ................... 395/182.09 |
| 5,778,433 | A | * | 7/1998 | Collins et al. ............... 711/135 |
| 5,781,716 | A |   | 7/1998 | Hemphill et al. ...... 395/182.02 |
| 5,790,775 | A | * | 8/1998 | Marks et al. ........... 395/182.07 |
| 5,805,790 | A | * | 9/1998 | Nota et al. ............. 395/182.08 |
| 5,815,651 | A | * | 9/1998 | Litt ........................ 395/182.08 |
| 5,875,307 | A | * | 2/1999 | Ma et al. ...................... 395/281 |
| 5,895,494 | A | * | 4/1999 | Scalzi et al. ................. 711/150 |
| 6,128,685 | A | * | 10/2000 | Cronin ........................ 710/126 |

OTHER PUBLICATIONS

IBM Technical disclosure, Sleep mode on computer processor bus to aid in fielf replaceable unit isolation, IBM Tech. disclosure, TDB–ACC–NO: NN8706384, 1–2, Jun. 1987.*

* cited by examiner

Primary Examiner—Nadeem Iqbal
(74) Attorney, Agent, or Firm—Akin, Gump, Strauss, Hauer & Feld, LLP (57) ABSTRACT

A scheme may be used to remove or replace a processor in a multiprocessor computer without the need for turning the computer off to replace the processor. In this scheme, the bus to which the processor is coupled is identified so that all processors coupled to the bus may be placed in sleep mode. This act does not alter the normal operation of processors that may be coupled to another bus. Once the processors are in sleep mode, the processor may be removed or replaced. Afterward, all processors may be returned to normal operation.

62 Claims, 7 Drawing Sheets

HOT PROCESSOR SWAP IN A MULTIPROCESSOR PERSONAL COMPUTER SYSTEM

BACKGROUND OF THE INVENTION

1. Field of the Invention

The present invention relates generally to computer systems and, more particularly, to methods and apparatus for facilitating the removal or replacement of a bad processor.

2. Description of the Related Art

About two decades ago, a relatively compact and basic computing device, which would come to be known as the personal computer or PC, was being developed. Like all personal computers since, these early personal computers utilized microprocessors coupled to various types of memory devices. However, due to the extremely limited computing capabilities of these early microprocessors and the limited size and costliness of high speed memory, these early personal computers truly were nothing but stand alone personal computing devices.

In the intervening years, microprocessors, memory devices, software, and many other portions of a computing system have seen rapid improvements in speed, capacity, complexity, and performance. By way of example, the latest generation microprocessors from Intel Corporation include the Pentium, Pentium Pro, and Pentium II Xeon microprocessors. These processors are so powerful that they not only would have been considered an unbelievable evolution over the Z80 and 8080 microprocessors of two decades ago, but they also offer significant enhancements over the prior generation 486 processors. Even in view of this rapid and incredible improvement of microprocessors, the resource requirements of software are always increasing, as are the variety of uses for "personal" computers. These needs, in turn, drive the need for the design and development of ever more powerful and efficient computer systems.

In view of these vast technological improvements, personal computers have made great strides from their humble beginnings to provide solutions for the ever expanding needs and desires of the computing public. Over the course of the past twenty years, personal computers have become an indispensable part of everyday life. Virtually every business relies to some degree upon personal computer systems, and personal computers are now found in many homes. Indeed, personal computers control everything from stock market trading to telephone networks.

For example, two decades ago, virtually all large or complicated computing operations, from data processing to telephone networks, were handled by large mainframe computers. However, networks of microprocessor-based personal computers have made tremendous inroads into areas that were once the exclusive domain of such large mainframe computers. Such networks of personal computers provide the computing power and centralized access to data of mainframe systems, along with the distributed computing capability of stand alone personal computers. These networks typically include tens, hundreds, or even thousands of personal computers, including powerful personal computers that can act as servers. Indeed, as such networks have become larger and more complex, there has been a need for improving the computing performance of servers on the network. To address this need for more powerful servers, multiple processors are now being used in personal computers which are configured to act as servers.

The expansion of microprocessor-based personal computers into the mainframe domain, however, has not been problem free. Mainframe computers have historically been designed to be reliable and extremely fault tolerant. In other words, a failure of a portion of the mainframe computer does not typically result in lost or corrupted data or extensive down time. Moreover, mainframe computers have historically been very service friendly. In other words, mainframe computers may be upgraded or repaired, in many circumstances, without shutting down the computer. Because personal computer networks are increasingly being used instead of mainframe systems, users are demanding that such networks provide fault tolerance and serviceability similar to that found in the mainframe systems.

In view of these user demands, manufacturers have devised various ways for providing fault tolerance in personal computer networks. Many of these developments have concentrated on the fault tolerance of the servers in a personal computer network, because servers are typically the cornerstone of most networks. In other words, because the servers typically provide applications, data, and communications among the various work stations, the failure of one server could cause the entire network to fail.

In one network fault tolerance scheme, two servers operate independently of each other but are capable of handling an increased workload if one of the servers fails. In such a scheme, each server periodically transmits a "heartbeat" message over the network to the other server to indicate that the transmitting server is functioning properly. If the receiving server does not receive the heartbeat message within a predetermined time interval, then the receiving server concludes that the transmitting server has failed and seizes the workload of the transmitting server.

In regard to the individual multiprocessor computers that are typically used as servers, one problem that may occur involves the failure of one of the multiple processors. Because of this possibility, a fault-tolerance scheme should include the ability to detect when one of the multiple processors has failed. When a processor failure has been detected, it would also be desirable to detect which processor has failed so that the computer may discontinue use of the processor and rely on the remaining processors.

When a faulty processor or server has been detected and removed from operation, it would be desirable to repair or replace the faulty component with minimal disruption to the network. However, when a processor fails, the computer of which it is a part typically crashes. Thus, it must be taken out of service temporarily so that the failed processor may be replaced. Depending upon the redundancy and complexity of the computer system, such a temporary removal may have wide ranging effects, from slightly degrading the overall performance of the computer system to temporarily removing the computer system from service.

In addition to the unscheduled downtime caused by processor failures, it is typically desirable to upgrade a computer's processors from time to time. Such upgrades must typically be scheduled during non-peak times in order to minimize the downtime or performance degradation of the networked computer system.

The present invention may address one or more of the problems discussed above.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In a multiprocessor computer, it may be desirable to remove or replace one or more of the processors for various reasons. As described herein, the computer may remain operative during processor removal or replacement. In a computer having a split bus design, for example, the bus to which the processor to be removed or replaced is coupled to is identified. The processes on the identified bus are interrupted and rescheduled, and all processors on the identified bus are placed into a sleep mode. The power to the processor to be removed or replaced is disconnected, and the user is informed that the processor may be removed or replaced. Once the processor has been removed or replaced, all processors on the identified bus are returned to normal operation.

BRIEF DESCRIPTION OF THE DRAWINGS

Various advantages of the invention may become apparent upon reading the following detailed description of specific embodiments and upon reference to the drawings in which.

DETAILED DESCRIPTION OF SPECIFIC EMBODIMENTS

Figure 1:
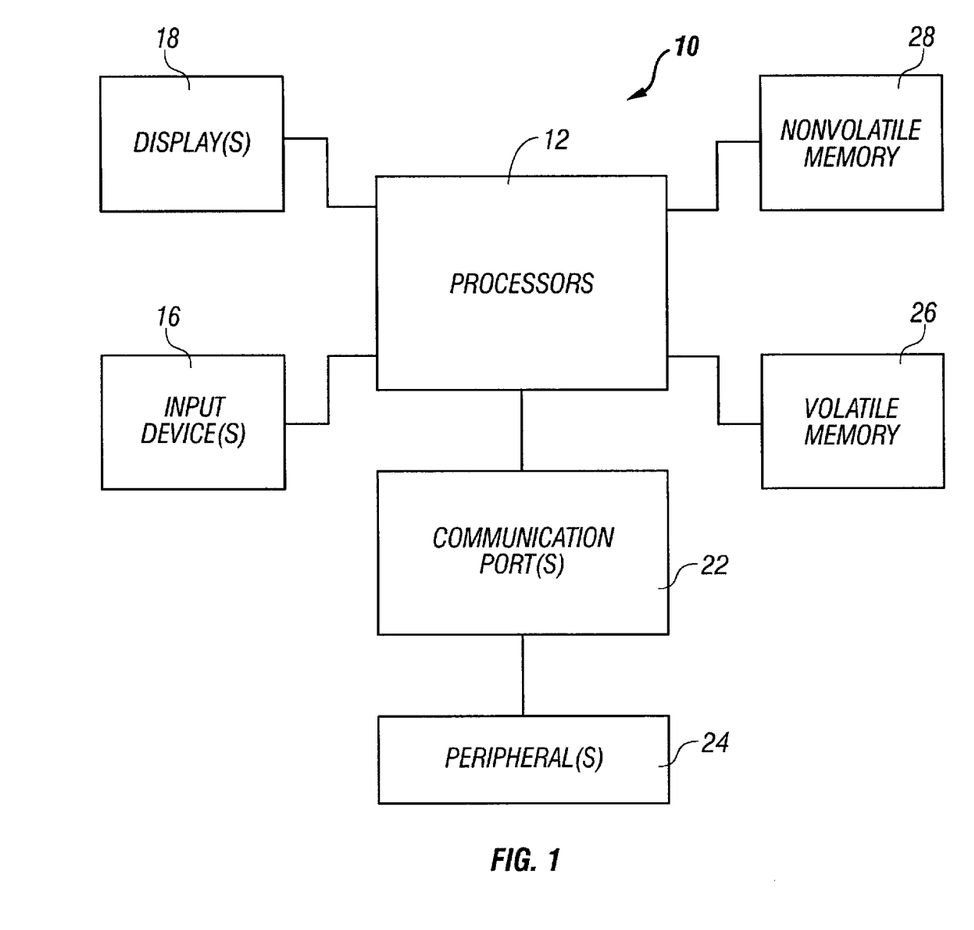
FIG. 1 illustrates a high level block diagram of an exemplary multiprocessor computer system.

Turning now to the drawings, and referring initially to FIG. 1, a block diagram depicting a multiprocessor computer system, generally designated by the reference numeral 10, is illustrated. In this embodiment of the system 10, multiple processors 12, such as microprocessors, control many of the functions of the system 10. In one particular embodiment, the processors 12 may be Pentium II Xeon processors available from Intel Corporation, for example.

Various other devices may be coupled to the processors 12, depending upon the functions that the system 10 performs. For instance, the system 10 may include various input devices. The input devices may include user interfaces such as a keyboard, a mouse, and/or a voice recognition system, for instance. The system 10 may also include a display 18. The display 18 may include a CRT, a flat panel display, LEDs, a graphical user interface (GUI), and/or an audio system, for instance.

A communications port 22, such as a network interface card for example, may also be coupled to the processors 12. The communications port 22 may be coupled to one or more peripheral devices 24. Such peripheral devices 24 may include a modem, a printer, and/or a scanner, for instance. Of course, the peripheral devices 24 may also include additional computers, as the computer system 10 may act as a server in a computer network that includes multiple computers and other peripheral devices.

Because the processors 12 control the functioning of the system 10 generally under the control of software programming, memory is coupled to the processors 12 to store and to facilitate execution of these programs. For instance, the processor 12 may be coupled to volatile memory 26, which may include dynamic random access memory DRAM) and/or static random access memory (SRAM). In addition, the processors 12 may be coupled to nonvolatile memory 28, which may include read only memory, a hard drive, and/or flash memory. Typically, the size of the nonvolatile memory 28 is selected to be larger enough to store any necessary operating system, certain application programs, and fixed data, while the volatile memory 26 may be quite large so that it may store dynamically loaded applications.

Figure 2:
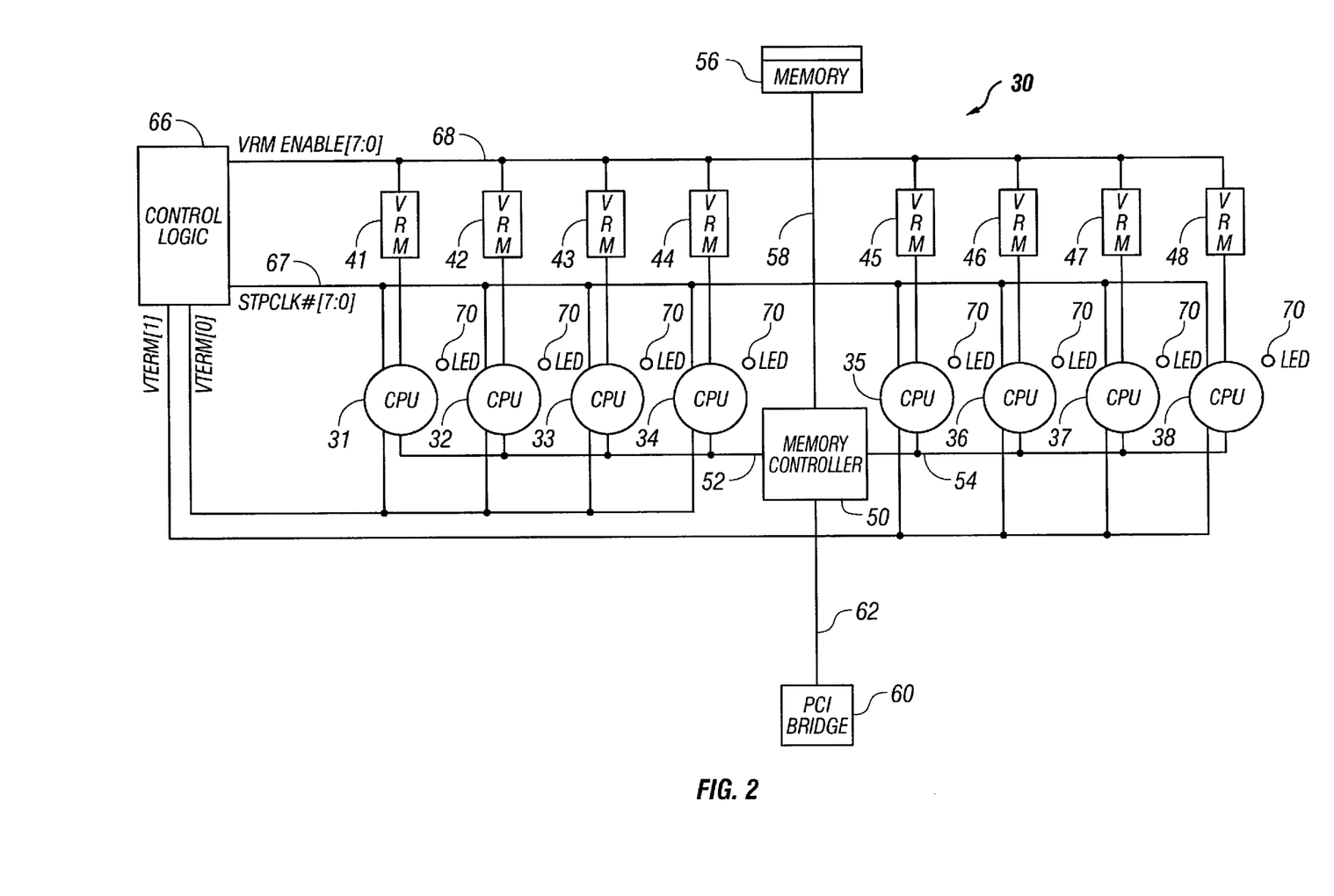
FIG. 2 illustrates a block diagram of an exemplary split bus multiprocessor computer.

A block diagram of a multiprocessor personal computer, such as one that may be used in the system 10, is illustrated in FIG. 2 and generally designated by the reference numeral 30. In this embodiment, the computer 30 includes eight processors, or CPUs, 31, 32, 33, 34, 35, 36, 37, and 38. Each of the processors 31–38 is illustrated as being powered by its own dedicated voltage regulator module (VRW 41, 42, 43, 44, 45, 46, 47, and 48, respectively.

As in a conventional computer, each of the processors 31–38 are coupled to a memory controller 50 via a bus. Because the illustrated computer 30 is a split bus design, the processors 31–34 communicate with the memory controller 50 via a bus 52, and the processors 35–38 communicate with the memory controller 50 via a bus 54. However, as described below with reference to FIGS. 4 and 5, the teachings set forth herein apply to a single bus design as well. The memory controller 50 communicates with a memory 56 via a bus 58 and with a PCI bridge 60 via a bus 62, as is known in the art. As described with reference to FIG. 1, the memory 56 may include, for instance, volatile memory and/or nonvolatile memory.

Unlike conventional computers, the computer 30 advantageously includes a fault detection scheme that tests each of the processors 31–38 during the operation of the computer 30. If one of the processors 31–38 is determined to have failed in some respect, the failed processor is removed from the continued operation of the computer 30 and the user or administrator of the computer 30 is notified of the processor failure.

Various exemplary methods and apparatus for implementing such a fault detection scheme are described in concurrently filed and co-pending U.S. patent application Ser. No. 09/196,463 entitled "Method and Apparatus for Determining a Processor Failure in a Multiprocessor Computer," which is hereby incorporated by reference. For example, if the processors 31–38 are Pentium Pro or Pentium If Xeon processors, a STPCLK# (stop clock) signal may be asserted by the control logic 66 on bus 67 to place a failed processor into a low power state. In response to a STPCLK# signal, the processor puts itself into a stop grant state and stops providing internal clock signals to all units except the bus unit and the APIC unit. The processor will continue to snoop bus transactions while in the stop grant state.

The fault detection circuit disclosed in this reference may be implemented as part of the control logic 66, which delivers an interrupt signal in response to the detection of a failed processor. In response to the interrupt signal, the failed processor is identified, removed from continued operation, and the user is notified of the particular processor failure. As illustrated in FIG. 2, the control logic 66 may illuminate an appropriate LED 70 located near each respective processor to indicate which processor has failed, although a variety of other techniques, such as a GUI, an LCD, or CRT message, may also be used.

Figure 3:
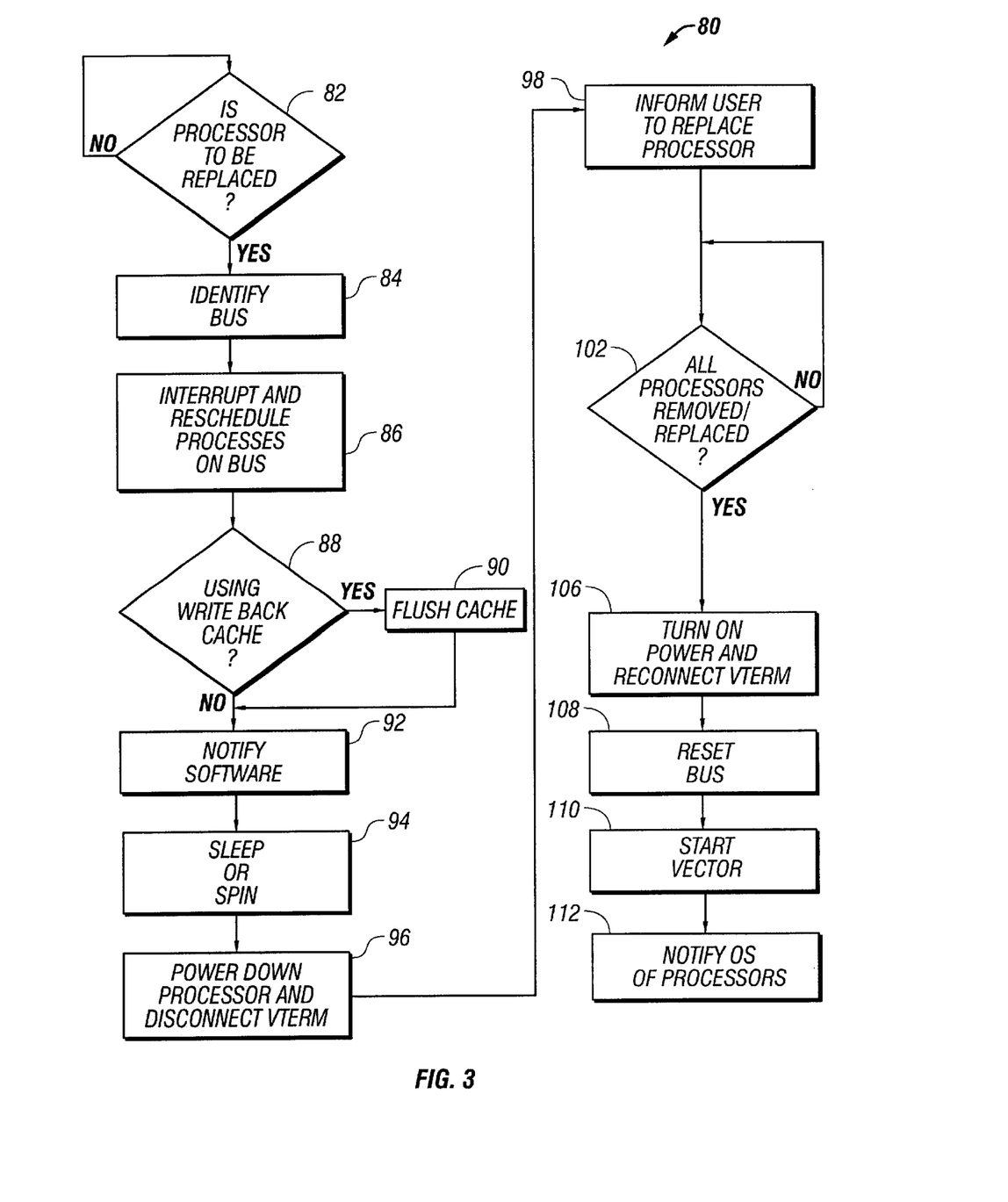
FIG. 3 illustrates a flowchart of an exemplary method for replacing a processor in the multiprocessor computer of FIG. 2.

Referring now to FIG. 3, a flowchart 80 illustrates an example of an exemplary method for removing or replacing one or more of the processors 31–38 in the computer 30 of FIG. 2. Other than the user actions, this method may be implemented in software so that it may be downloaded onto a suitable multiprocessor computer via disk, read only memory, or over the internet, for example, or it may be partially implemented in hardware. Indeed, as discussed below, the precise manner in which the software implements a scheme of this type may depend upon the actual hardware included within the computer 30. In one example, the software may be a system management driver stored in system ROM which would run on a functional or diagnostic processor, where the highest interrupt may be used to run the system management routine.

First, it is determined whether a processor is to be removed or replaced. (Block 82). Typically, the user or administrator will signal the computer 30 when a processor is to be removed or replaced. For example, the scheme may be implemented as part of a program which runs on the computer and automatically queries the user or administrator regarding desired removal or replacement of a processor in response to the detection of a processor failure, as discussed above. In this situation, the fault detection scheme has already identified and discontinued the operation of the failed processor, as discussed in the reference incorporated above for example. Of course, if the user desires to remove or replace a processor which has not failed (during an upgrade or routine maintenance, for example), the user may alert the program that a processor is to be removed or replaced. In this event, the user will typically provide information regarding the identity or location of the processor to be removed or replaced, such as the CPU type or logical ID.

Once it has been determined that a processor is to be removed or replaced, the bus 52 or 54 on which the processor is located is identified. (Block 84). For the sake of clarity, in this example we will assume that the processor 31 is to be replaced, so the identified bus is the bus 52. After the bus has been identified, all processes or threads running on processors on the identified bus 52 are interrupted and rescheduled. (Block 86). Specifically, the operating system is notified that the processors 31–34 will be removed from service, and the operating system reschedules all processes or threads to run on the processors 35–38 on bus 54.

It should be understood that the processors 31–34 typically, but not necessarily, use write back caches during normal operation. Thus, it is determined whether write back caches are being used. (Block 88). If so, the caches of all the operational processors 31–34 on the identified bus 52 are flushed to save any updated lines in the memory 56. (Block 90). On the other hand, if write through caches are being used, writing back modified cache lines would not be needed when the processors 31–34 are interrupted because both the main memory and the caches have identical copies. Although write through caches may not allow the computer 30 to provide the same level of performance as write back caches, this may be an acceptable trade off in terms of enhanced fault tolerance.

As each processor completes the above steps, the controlling software is notified and the processor is placed in a sleep or spin mode. (Blocks 92 and 94). Once all of the processors 31–34 on the identified bus 52 have entered the sleep or spin mode, the processor 31 to be removed or replaced is powered down. (Block 96). In this embodiment, this may be easily accomplished by disabling the VRM 41 associated with the processor 31. As illustrated in FIG. 2, the control logic 66 delivers the appropriate signal on bus 68 to the VRM 41 to disable the selected processor 31. The $V_{term}$ is also disconnected on the identified bus 52 to place the bus 52 in a state of quiescence. (Block 96).

The processor 31 is now ready to be removed or replaced, so the user is instructed to remove or replace the processor. (Block 98). This instruction may be delivered to the user in any suitable manner, such as by using the display(s) mentioned above. Next, the user removes the processor 31. With the processor 31 removed, the user may now replace it with another processor, or the user may wake up the computer without the processor 31. (Block 102). If the processor 31 is replaced, the new processor is installed and $V_{term}$ is reconnected prior to powering up the processors 31–34. (Block 106). The identified bus 52 is then reset, the processors are reinitialized, and the operating system is notified of which processors are available so that it may reschedule processes and threads on the available resources. (Blocks 108, 110, and 112). Thus, the computer 30 is again operating at a full performance level.

Using the method described above, it should be noted that the processors 31–34 and the bus 52 are effectively removed from operation in the computer 30, while the remaining processors 35–38 and the bus 54 continue to operate normally. The replacement of the processor 31 and the reinitialization of the processors 31–34 and the bus 52 do not affect the operation of the remainder of the computer 30. Thus, although the removal or replacement of a failed processor may degrade the performance of the computer somewhat due to the temporary downtime of the processors 31–34 on identified bus 52, the entire processor removal or replacement operation may take place without removing the computer 30 from service.

Figure 4:
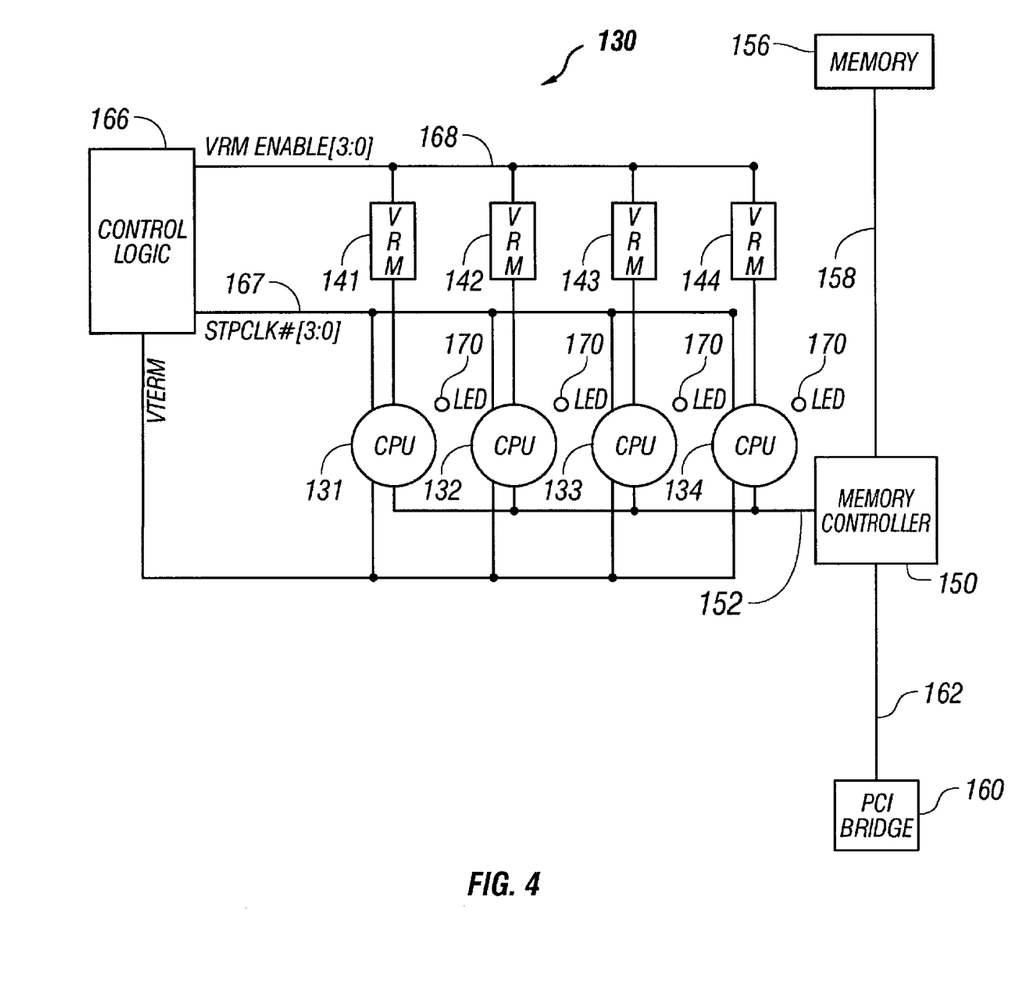
FIG. 4 illustrates a block diagram of an exemplary single bus multiprocessor computer.

The discussion above related to the replacement of a processor in a split bus computer 30. However, a similar method may also be used to perform a "warm" swap in a single bus computer without the need to reboot the computer. A block diagram of a multiprocessor personal computer having a single bus, such as one that may be used in the system 10, is illustrated in FIG. 4 and generally designated by the reference numeral 130. In this embodiment, the computer 130 includes four processors, or CPUs, 131, 132, 133, and 134. Each of the processors 131–134 is illustrated as being powered by its own dedicated voltage regulator module (VRM) 141, 142, 143, and 144, respectively.

As in a conventional computer, each of the processors 131–134 are coupled to a memory controller 150 via a bus. Because the illustrated computer 130 is a single bus design, the processors 131–134 communicate with the memory controller 150 via a bus 152. The memory controller 150 communicates with a memory 156 via a bus 158 and with a PCI bridge 160 via a bus 162, as is known in the art. As described with reference to FIG. 1, the memory 156 may include, for instance, volatile memory and/or nonvolatile memory.

Unlike conventional computers, the computer 130 advantageously includes a fault detection scheme that tests each of the processors 131–134 during the operation of the computer 130. If one of the processors 131–134 is determined to have failed in some respect, the failed processor is removed from the continued operation of the computer 130 and the user or administrator of the computer 130 is notified of the processor failure. Various exemplary methods and apparatus for implementing such a fault detection scheme are described in concurrently filed and co-pending U.S. patent application Ser. No. 09/196,463 entitled "Method and Apparatus for Determining a Processor Failure in a Multiprocessor Computer," which was hereby incorporated by reference above. For example, if the processors 131–134 are Pentium Pro or Pentium II Xeon processors, a STPCLK# (stop clock) signal may be asserted by the control logic 166 on bus 167 to place a failed processor into a low power state. In response to a STPCLK# signal, the processor puts itself into a stop grant state and stops providing internal clock signals to all units except the bus unit and the APIC unit. The processor will continue to snoop bus transactions while in the stop grant state.

The fault detection circuit disclosed in this reference may be implemented as part of the control logic 166, which delivers an interrupt signal in response to the detection of a failed processor. In response to the interrupt signal, the failed processor is identified, removed from continued operation, and the user is notified of the particular processor failure. As illustrated in FIG. 2, the control logic 166 may illuminate an appropriate LED 170 located near each respective processor to indicate which processor has failed, although a variety of other techniques, such as a GUI, an LCD, or CRT message, may also be used.

Figure 5:
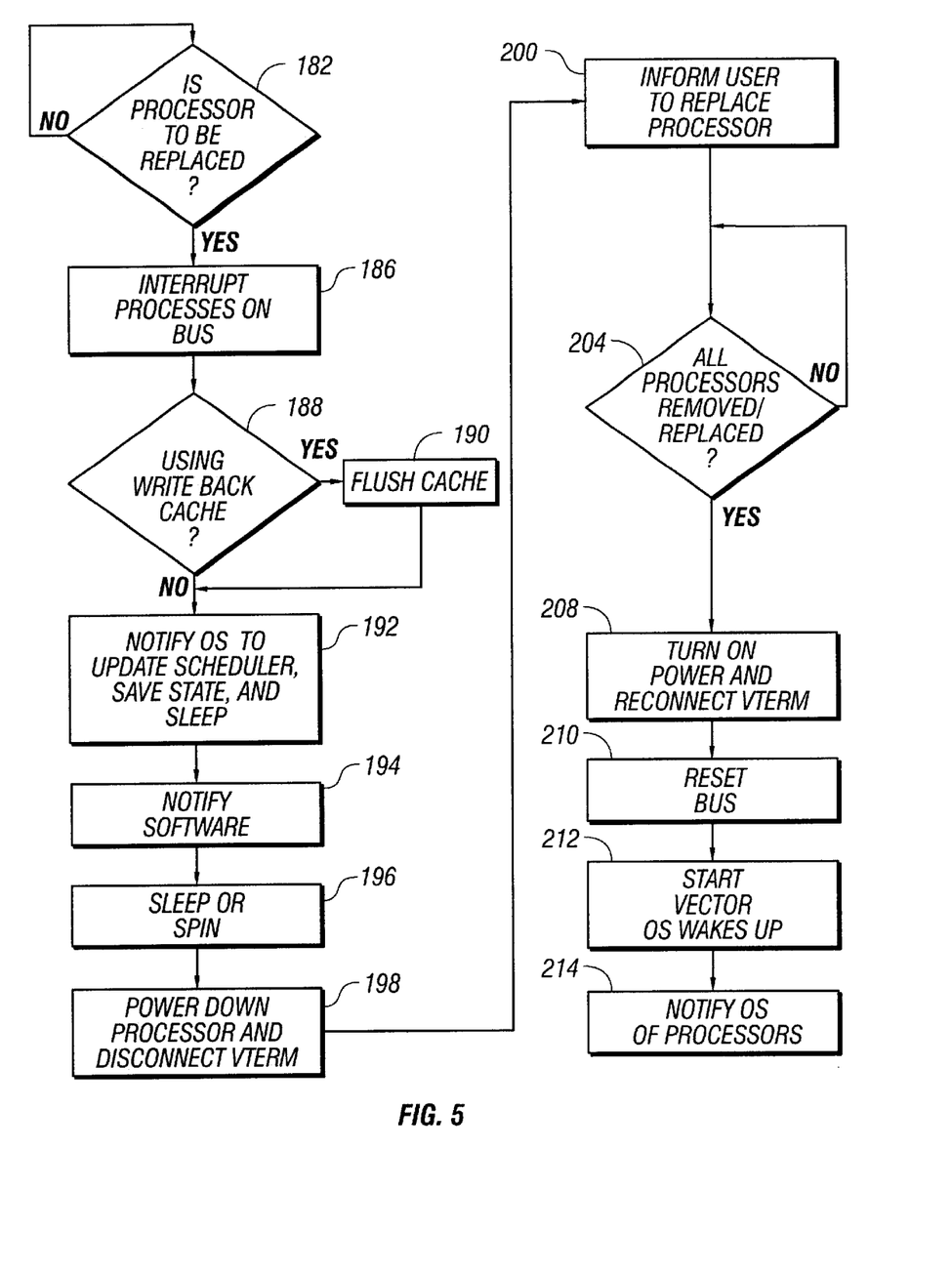
FIG. 5 illustrates a flowchart of an exemplary method for replacing a processor in the multiprocessor computer of FIG. 4.

Referring now to FIG. 5, a flowchart 180 illustrates an example of an exemplary method for removing or replacing one or more of the processors 131–134 in the computer 130 of FIG. 4. As in the previous embodiment, other than the user actions, this method may be implemented in software, so that it may be downloaded onto a suitable multiprocessor computer via disk, read only memory, or over the internet, for example, or it may be partially implemented in hardware. Indeed, as discussed below, the precise manner in which the software implements a scheme of this type may depend upon the actual hardware included within the computer 130. In one example, the software may be a system management driver stored in system ROM which would run on a functional or diagnostic processor, where the highest interrupt may be used to run the system management routine.

First, it is determined whether a processor is to be removed or replaced. (Block 182). Typically, the user or administrator will signal the computer 130 when a processor is to be removed or replaced. For example, the scheme may be implemented as part of a program which runs on the computer and automatically queries the user or administrator regarding desired. removal or replacement of a processor in response to the detection of a processor failure, as discussed above. In this situation, the fault detection scheme has already identified and discontinued the operation of the failed processor, as discussed in the reference incorporated above for example. Of course, if the user desires to replace a processor which has not failed (during an upgrade or routine maintenance, for example), the user may alert the program that a processor is to be replaced. In this event, the user will typically provide information regarding the identity or location of the processor to be removed or replaced, such as the CPU type or the logical ID. For the sake of clarity, we will assume that the processor 131 is to be replaced due to either an upgrade or failure.

Once it has been determined that a processor is to be removed or replaced, all processes or threads running on the processors on the bus 152 are interrupted. (Block 186). Since the processors 131–134 typically, but not necessarily, use write back caches during normal operation, it is determined whether write back caches are being used. (Block 188). If so, the caches of all the operational processors 131–134 on the bus 152 are flushed to save any updated lines in the memory 156. (Block 190). On the other hand, if write through caches are being used, writing back modified cache lines would not be needed when the processors 31–34 are interrupted because both the main memory and the caches have identical copies. Although write through caches may not allow the computer 130 to provide the same level of performance as write back caches, this may be an acceptable trade off in terms of enhanced fault tolerance.

After each processor completes the above steps, the operating system is notified of the processor replacement, so that it may update its scheduler, save its current state, and go to sleep. (Block 192). Then, the controlling software is notified, and each processor is placed in a sleep or spin mode. (Blocks 194 and 196). Once all of the processors 131–134 on the bus 152 have entered the sleep or spin mode, the processor 131 to be removed or replaced is powered down. (Block 198). In this embodiment, this may be easily accomplished by disabling the VRM 141 associated with the processor 131. As illustrated in FIG. 4, the control logic 166 delivers the appropriate signal on bus 168 to the VRM 141 to disable the selected processor 131. The $V_{term}$ is also disconnected on the bus 152 to place the bus 152 in a state of quiescence. (Block 198).

The processor 131 is now ready to be removed or replaced, so the user is instructed to replace the processor. (Block 200). This instruction may be delivered to the user in any suitable manner, such as by using the display(s) mentioned above. Next, the user removes the processor 131. With the processor 131 removed, the user may now replace it with another processor, or the user may wake up the computer without the processor 131. (Block 204). If the processor 131 is replaced, the new processor is installed and $V_{term}$ is reconnected prior to powering up the processors 131–134. (Block 208). The bus 152 is then reset, the processors are reinitialized, and the operating system is notified of which processors are available so that it may reschedule resources on start up. (Blocks 210, 212, and 214). It should be noted that when the processors are being reinitialized and are going through the initial start vector, the system will recognize that the operating system is already loaded and in sleep mode, so the operating system will resume with the processors that it has been notified are available. Thus, the computer 130 is again operating at a full performance level.

Using the method described above, it should be noted that the processors 131–134 and the bus 152 are effectively removed from operation in the computer 130 while the processor 131 is being removed or replaced. However, the processors 131–134 are merely put to sleep—they are not shut off. Thus, this method does not cause the loss of data, and it does not require the computer 130 to be rebooted after the processor has been replaced. Therefore, although the replacement of a failed processor may cause the computer 130 to be temporarily removed from the system 10, the downtime of the computer 130 is minimized.

Figure 6:
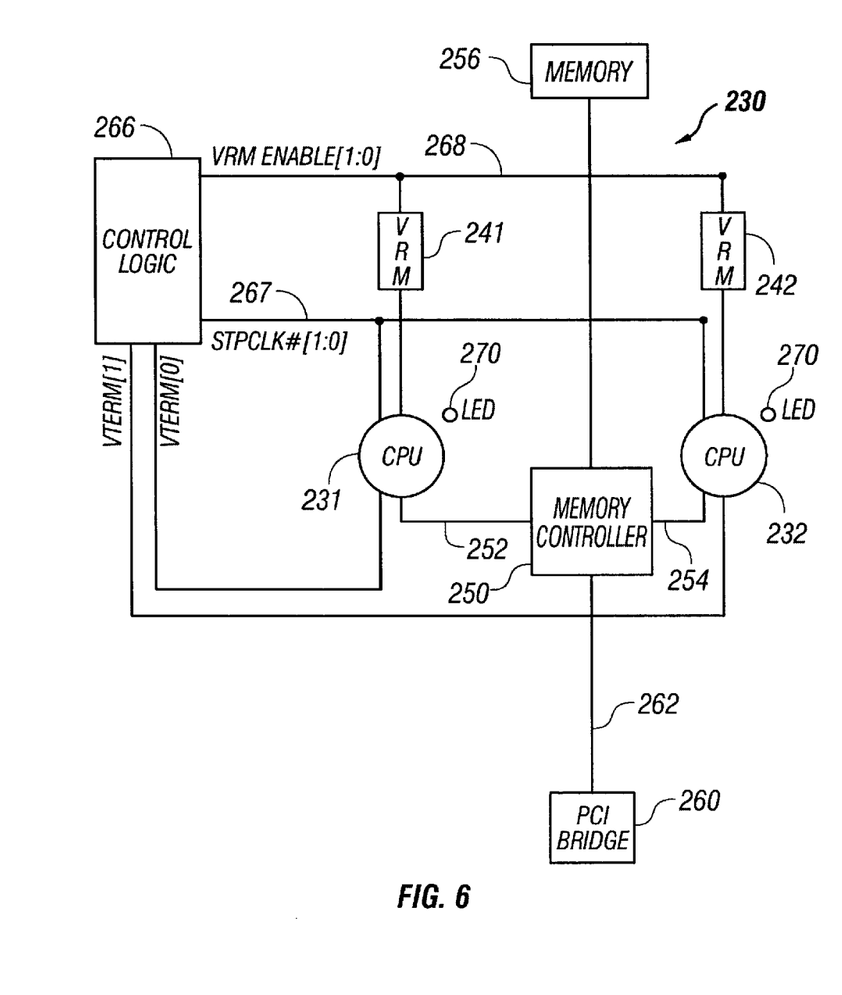
FIG. 6 illustrates a block diagram of an exemplary point-to-point bus multiprocessor computer.

In each of the embodiments described above, multiple processors are coupled to the same bus. However, a technique similar to those described above may be implemented on a multiprocessor personal computer having a point-to-point bus implementation in which each processor is coupled to its own bus. A block diagram of such a multiprocessor personal computer, such as one that may be used in the system 10, is illustrated in FIG. 6 and generally designated by the reference numeral 230. In this embodiment, the computer 230 includes two processors, or CPUs, 231 and 232. Each of the processors 231–232 is illustrated as being powered by its own dedicated voltage regulator module (VRM) 41 and 42, respectively.

Each of the processors 231–232 are coupled to a memory controller 250 via a bus. Because the illustrated computer 230 is a point-to-point bus design, the processor 231 communicates with the memory controller 250 via a bus 252, and the processor 232 communicates with the memory controller 250 via a bus 254. However, as described below with reference to FIGS. 6 and 7, the teachings set forth herein apply to a point-to-point bus design as well. The memory controller 250 communicates with a memory 256 via a bus 258 and with a PCI bridge 260 via a bus 262, as is known in the art. As described with reference to FIG. 1, the memory 256 may include, for instance, volatile memory and/or nonvolatile memory.

Unlike conventional computers, the computer 230 advantageously includes a fault detection scheme that tests each of the processors 231–232 during the operation of the computer 230. If one of the processors 231–232 is determined to have failed in some respect, the failed processor is removed from the continued operation of the computer 230 and the user or administrator of the computer 230 is notified of the processor failure.

Various exemplary methods and apparatus for implementing such a fault detection scheme are described in concurrently filed and co-pending U.S. patent application Ser. No. 09/196,463 entitled "Method and Apparatus for Determining a Processor Failure in a Multiprocessor Computer," which was incorporated by reference above. For example, if the processors 231–232 are Pentium Pro or Pentium II Xeon processors, a STPCLK# (stop clock) signal may be asserted by the control logic 266 on bus 267 to place a failed processor into a low power state. In response to a STPCLK# signal, the processor puts itself into a stop grant state and stops providing internal clock signals to all units except the bus unit and the APIC unit. The processor will continue to snoop bus transactions while in the stop grant state.

The fault detection circuit disclosed in this reference may be implemented as part of the control logic 266, which delivers an interrupt signal in response to the detection of a failed processor. In response to the interrupt signal, the failed processor is identified, removed from continued operation, and the user is notified of the particular processor failure. As illustrated in FIG. 6, the control logic 266 may illuminate an appropriate LED 270 located near each respective processor to indicate which processor has failed, although a variety of other techniques, such as a GUI, an LCD, or CRT message, may also be used.

Figure 7:
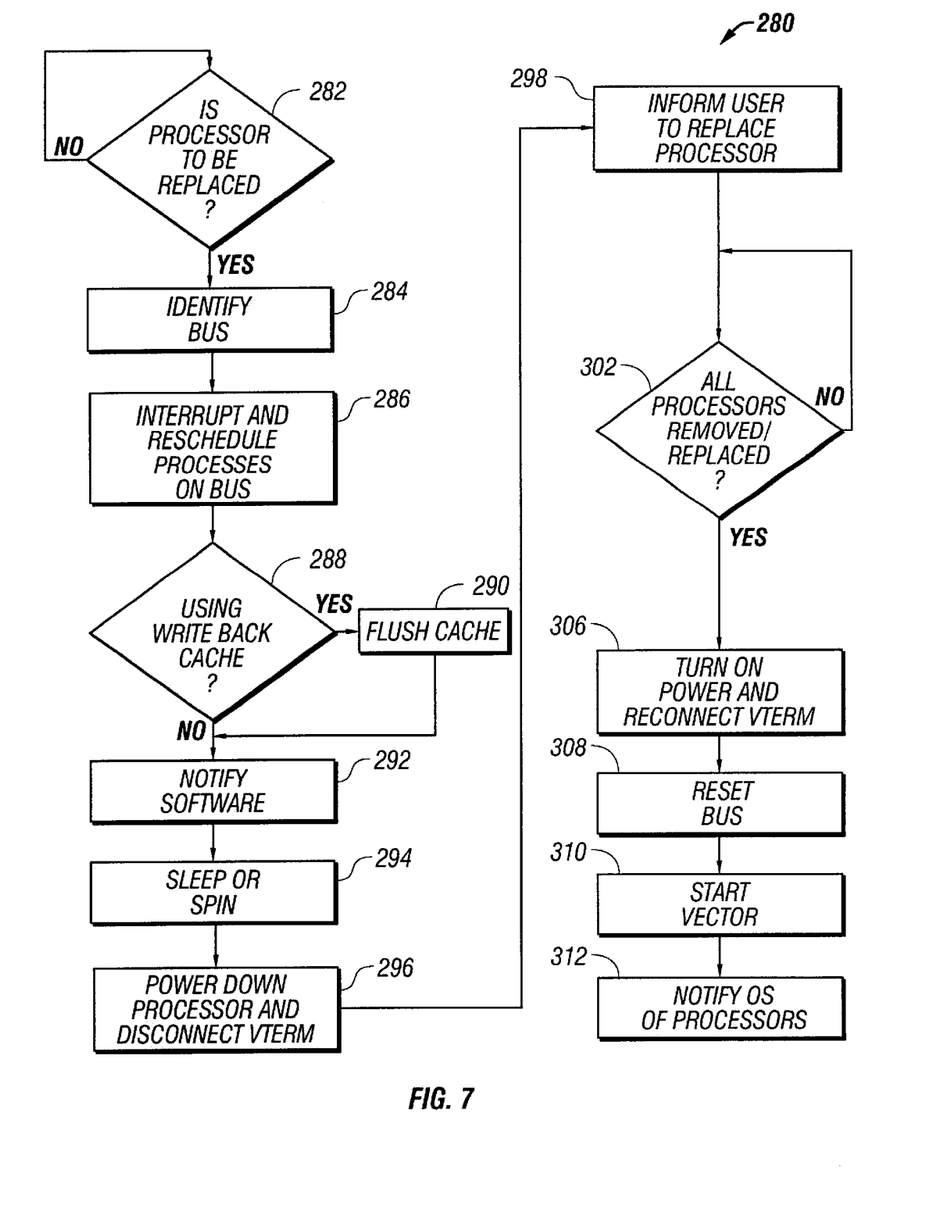
FIG. 7 illustrates a flowchart of an exemplary method for replacing a processor in the multiprocessor computer of FIG. 6.

Referring now to FIG. 7, a flowchart 280 illustrates an example of an exemplary method for removing or replacing one of the processors 231–232 in the computer 230 of FIG. 6. Other than the user actions, this method may be implemented in software so that it may be downloaded onto a suitable multiprocessor computer via disk, read only memory, or over the internet, for example, or it may be partially implemented in hardware. Indeed, as discussed below, the precise manner in which the software implements a scheme of this type may depend upon the actual hardware included within the computer 230. In one example, the software may be a system management driver stored in system ROM which would run on a functional or diagnostic processor, where the highest interrupt may be used to run the system management routine.

First, it is determined whether a processor is to be removed or replaced. (Block 282). Typically, the user or administrator will signal the computer 230 when a processor is to be removed or replaced. For example, the scheme may be implemented as part of a program which runs on the computer and automatically queries the user or administrator regarding desired removal or replacement of a processor in response to the detection of a processor failure, as discussed above. In this situation, the fault detection scheme has already identified and discontinued the operation of the failed processor, as discussed in the reference incorporated above for example. Of course, if the user desires to remove or replace a processor which has not failed (during an upgrade or routine maintenance, for example), the user may alert the program that a processor is to be removed or replaced. In this event, the user will typically provide information regarding the identity or location of the processor to be removed or replaced, such as the CPU type or logical ID.

Once it has been determined that a processor is to be removed or replaced, the bus 252 or 254 on which the processor is located is identified. (Block 284). For the sake of clarity, in this example we will assume that the processor 231 is to be replaced, so the identified bus is the bus 252. After the bus has been identified, all processes or threads running on processors on the identified bus 252 are interrupted and rescheduled. (Block 286). Specifically, the operating system is notified that the processor 231 will be removed from service, and the operating system reschedules all processes or threads to run on the processor 232 on bus 254.

It should be understood that the processor 231 typically, but not necessarily, uses a write back cache during normal operation. Thus, it is determined whether a write back cache is being used. (Block 288). If so, the cache of the processor 231 on the identified bus 252 is flushed to save any updated lines in the memory 256. (Block 290). On the other hand, if a write through cache is being used, writing back modified cache lines would not be needed when the processor 231 is interrupted because both the main memory and the cache have identical copies. Although write through caches may not allow the computer 230 to provide the same level of performance as write back caches, this may be an acceptable trade off in terms of enhanced fault tolerance.

As each processor completes the above steps, the controlling software is notified and the processor is placed in a sleep or spin mode. (Blocks 292 and 294). Once the processor 231 on the identified bus 252 has entered the sleep or spin mode, the processor 231 to be removed or replaced is powered down. (Block 296). In this embodiment, this may be easily accomplished by disabling the VRM 241 associated with the processor 231. As illustrated in FIG. 6, the control logic 266 delivers the appropriate signal on bus 268 to the VRM 241 to disable the selected processor 231. The $V_{term}$ is also disconnected on the identified bus 252 to place the bus 252 in a state of quiescence. (Block 296).

The processor 231 is now ready to be removed or replaced, so the user is instructed to remove or replace the processor. (Block 298). This instruction may be delivered to the user in any suitable manner, such as by using the display(s) mentioned above. Next, the user removes the processor 231. With the processor 231 removed, the user may now replace it with another processor, or the user may wake up the computer without the processor 231. (Block 302). If the processor 231 is replaced, the new processor is installed and $V_{term}$ is reconnected prior to powering up the processor 231. (Block 306). The identified bus 252 is then reset, the processors are reinitialized, and the operating system is notified of which processors are available so that it may reschedule processes and threads on the available resources. (Blocks 308, 310, and 312). Thus, the computer 230 is again operating at a full performance level.

Using the method described above, it should be noted that the processor 231 and the bus 252 are effectively removed from operation in the computer 230, while the remaining processor 232 and the bus 254 continue to operate normally. The replacement of the processor 231 and the reinitialization of the processor 231 and the bus 252 do not affect the operation of the remainder of the computer 230. Thus, although the removal or replacement of a failed processor may degrade the performance of the computer somewhat due to the temporary downtime of the processor 231, the entire processor removal or replacement operation may take place without removing the computer 230 from service.

Although the embodiments described above dealt with the removal or replacement of a single processor, multiple processors may be removed or replaced using substantially the same techniques. If multiple processors are to be removed or replaced, these processors may be identified by the failure detection system or by the user via a software interface. This information may be stored in a register in the control logic, for instance, so that the control logic could then watch processor presence signals to determine when each processor is removed or replaced. When all removals or replacements have been made, the control logic will begin the reinitialization sequence to return the computer to normal operation. If multiple processors on one bus are to be removed or replaced, due to failure for example, the bus and the processors on the bus may be handled as described above. However, if processors on different buses are to be removed or replaced, one bus and the processor(s) on that bus are handled first. After the processor(s) on the selected bus have been removed or replaced as described above, the other bus and the processor(s) on the other bus are then handled.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of replacing or removing a processor in a multiprocessor computer having a first plurality of processors coupled to a first bus and having a second plurality of processors coupled to a second bus, the method comprising the acts of:
   (a) determining that a processor is to be replaced or removed;
   (b) identifying to which of the first bus and the second bus the processor is coupled;
   (c) interrupting processes on the identified bus;
   (d) placing all processors coupled to the identified bus into a sleep mode;
   (e) disconnecting power to the processor;
   (f) informing a user to remove or replace the processor; and
   (g) returning all processors on the identified bus to normal operation after the processor has been replaced or removed.

2. The method, as set forth in claim 1, wherein act (a) comprises the act of:
   identifying which processor is to be removed or replaced.

3. The method, as set forth in claim 1, wherein act (c) comprises the act of:
   delivering a respective stop clock signal to each processor coupled to the identified bus.

4. The method, as set forth in claim 1, wherein act (c) comprises the act of:
   notifying an operating system of the computer to reschedule the processes on the identified bus.

5. The method, as set forth in claim 1, wherein act (c) comprises the acts of:
   determining whether the processors coupled to the identified bus include write back caches; and
   flushing the write back caches.

6. The method, as set forth in claim 1, wherein act (d) comprises the act of:
   placing the identified bus in a state of quiescence.

7. The method, as set forth in claim 6, wherein the act of placing the identified bus in a state of quiescence comprises the act of:
   disconnecting $V_{term}$ from the identified bus.

8. The method, as set forth in claim 1, wherein act (e) comprises the act of:
   shutting off a voltage regulator module associated with the processor.

9. The method, as set forth in claim 1, wherein act (f) comprises the act of:
   illuminating an LED located near each processor to be removed or replaced.

10. The method, as set forth in claim 1, wherein act (g) comprises the act of:
    resetting the identified bus.

11. The method, as set forth in claim 1, wherein act (g) comprises the act of:
    notifying an operating system of the computer of available processors coupled to the identified bus.

12. The method, as set forth in claim 1, wherein acts (a) through (g) are performed in order.

13. A method of removing or replacing a failed processor in a multiprocessor computer having a first plurality of processors coupled to a first bus and having a second plurality of processors coupled to a second bus, the method comprising the acts of:
    (a) identifying the failed processor;
    (b) ceasing operation of the failed processor;
    (c) determining that the failed processor is to be removed or replaced;
    (d) identifying to which of the first bus and the second bus the failed processor is coupled;
    (e) interrupting processes on the identified bus;
    (f) placing all operational processors coupled to the identified bus into a sleep mode;
    (g) disconnecting power to the failed processor;
    (h) informing a user to remove or replace the failed processor; and
    (i) returning all processors on the identified bus to normal operation after the failed processor has been removed or replaced.

14. The method, as set forth in claim 13, wherein act (e) comprises the act of:
    delivering a respective stop clock signal to each processor coupled to the identified bus.

15. The method, as set forth in claim 13, wherein act (e) comprises the act of:

flushing write back caches of all processors coupled to the identified bus.

16. The method, as set forth in claim 13, wherein act (e) comprises the acts of:

notifying an operating system of the computer to reschedule the processes on the identified bus.

17. The method, as set forth in claim 13, wherein act (f) comprises the act of:

placing the identified bus in a state of quiescence.

18. The method, as set forth in claim 17, wherein the act of placing the identified bus in a state of quiescence comprises the act of:

disconnecting $V_{term}$ from the identified bus.

19. The method, as set forth in claim 13, wherein act (g) comprises the act of:

shutting off a voltage regulator module associated with the processor.

20. The method, as set forth in claim 13, wherein act (h) comprises the act of:

illuminating an LED located near each processor to be removed or replaced.

21. The method, as set forth in claim 13, wherein act (i) comprises the act of:

resetting the identified bus.

22. The method, as set forth in claim 13, wherein act (i) comprises the act of:

notifying an operating system of the computer of available processors coupled to the identified bus.

23. The method, as set forth in claim 13, wherein acts (a) through (i) are performed in order.

24. A method of removing or replacing a processor in a multiprocessor computer having a plurality of processors coupled to a bus, the method comprising the acts of:

(a) determining that a processor is to be removed or replaced;

(b) interrupting processes on the bus;

(c) placing all processors coupled to the bus into a sleep mode;

(d) disconnecting power to the processor;

(e) informing a user to remove or replace the processor; and (f) returning all processors on the identified bus to normal operation after the processor has been removed or replaced.

25. The method, as set forth in claim 24, wherein act (a) comprises the act of:

identifying which processor is to be removed or replaced.

26. The method, as set forth in claim 24, wherein act (b) comprises the act of:

delivering a respective stop clock signal to each processor coupled to the bus.

27. The method, as set forth in claim 24, wherein act (b) comprises the act of:

flushing write back caches of all processors coupled to the bus.

28. The method, as set forth in claim 24, wherein act (b) comprises the acts of:

notifying an operating system of the computer to reschedule the processes.

29. The method, as set forth in claim 24, wherein act (c) comprises the act of:

placing the bus in a state of quiescence.

30. The method, as set forth in claim 29, wherein the act of placing the bus in a state of quiescence comprises the act of:

disconnecting $V_{term}$ from the bus.

31. The method, as set forth in claim 24, wherein act (d) comprises the act of:

shutting off a voltage regulator module associated with the processor.

32. The method, as set forth in claim 24, wherein act (e) comprises the act of:

illuminating an LED located near each processor to be removed or replaced.

33. The method, as set forth in claim 24, wherein act (d) comprises the act of:

resetting the bus.

34. The method, as set forth in claim 24, wherein act (f) comprises the act of:

notifying an operating system of the computer of available processors coupled to the bus.

35. The method, as set forth in claim 24, wherein acts (a) through (f) are performed in order.

36. A method of removing or replacing a failed processor in a multiprocessor computer having a plurality of processors coupled to a bus, the method comprising the acts of:

(a) identifying the failed processor;

(b) ceasing operation of the failed processor;

(c) determining that the failed processor is to be removed or replaced;

(d) interrupting processes on the bus;

(e) placing all operational processors coupled to the bus into a sleep mode;

(f) disconnecting power to the failed processor;

(g) informing a user to remove or replace the failed processor; and (h) returning all processors on the bus to normal operation after the failed processor has been removed or replaced.

37. The method, as set forth in claim 36, wherein act (d) comprises the act of:

delivering a respective stop clock signal to each processor coupled to the bus.

38. The method, as set forth in claim 36, wherein act (d) comprises the act of:

flushing write back caches of all processors coupled to the bus.

39. The method, as set forth in claim 36, wherein act (d) comprises the acts of:

notifying an operating system of the computer to reschedule the processes.

40. The method, as set forth in claim 36, wherein act (e) comprises the act of:

placing the bus in a state of quiescence.

41. The method, as set forth in claim 40, wherein the act of placing the bus in a state of quiescence comprises the act of:

disconnecting $V_{term}$ from the bus.

42. The method, as set forth in claim 36, wherein act (f) comprises the act of:

shutting off a voltage regulator module associated with the processor.

43. The method, as set forth in claim 36, wherein act (g) comprises the act of:

illuminating an LED located near each processor to be removed or replaced.

44. The method, as set forth in claim 36, wherein act (h) comprises the act of:

resetting the bus.

45. The method, as set forth in claim 36, wherein act (h) comprises the act of:

notifying an operating system of the computer of available processors coupled to the bus.

46. The method, as set forth in claim 36, wherein acts (a) through (h) are performed in order.

47. A multiprocessor computer comprising:

a first plurality of processors coupled to a first bus and a second plurality of processors coupled to a second bus;

means for determining that a processor is to be removed or replaced;

means for identifying to which of the first bus and the second bus the processor is coupled;

means for interrupting and rescheduling processes on the identified bus;

means for placing all processors coupled to the identified bus into a sleep mode;

means for disconnecting power to the processor;

means for informing a user to remove or replace the processor; and means for returning all processors on the identified bus to normal operation after the processor has been removed or replaced.

48. A multiprocessor computer comprising:

a first plurality of processors coupled to a first bus and a second plurality of processors coupled to a second bus;

means for identifying a failed processor;

means for ceasing operation of the failed processor;

means for determining that the failed processor is to be removed or replaced;

means for identifying to which of the first bus and the second bus the failed processor is coupled;

means for interrupting processes on the identified bus;

means for placing all operational processors coupled to the identified bus into a sleep mode;

means for disconnecting power to the failed processor;

means for informing a user to remove or replace the failed processor; and means for returning all processors on the identified bus to normal operation after the failed processor has been removed or replaced.

49. A multiprocessor computer comprising:

a plurality of processors coupled to a bus;

means for determining that one of the processors is to be removed or replaced;

means for interrupting processes on the bus;

means for placing all processors coupled to the bus into a sleep mode;

means for disconnecting power to the processor;

means for informing a user to remove or replace the processor; and means for returning all processors on the identified bus to normal operation after the processor has been removed or replaced.

50. A multiprocessor computer comprising:

a plurality of processors coupled to a bus;

means for identifying a failed processor among the plurality of processors;

means for ceasing operation of the failed processor;

means for determining that the failed processor is to be removed or replaced;

means for interrupting processes on the bus;

means for placing all operational processors coupled to the bus into a sleep mode;

means for disconnecting power to the failed processor;

means for informing a user to remove or replace the failed processor; and means for returning all processors on the bus to normal operation after the failed processor has been removed or replaced.

51. A method of replacing or removing a processor in a multiprocessor computer having a first processor coupled to a first bus and having a second processor coupled to a second bus, the method comprising the acts of:

(a) determining that a processor is to be replaced or removed;

(b) identifying to which of the first bus and the second bus the processor is coupled;

(c) interrupting processes on the identified bus;

(d) placing the processor coupled to the identified bus into a sleep mode;

(e) disconnecting power to the processor coupled to the identified bus;

(f) informing a user to remove or replace the processor coupled to the identified bus; and (g) returning the computer to normal operation after the processor has been replaced or removed.

52. The method, as set forth in claim 51, wherein act (a) comprises the act of:

identifying which processor is to be removed or replaced.

53. The method, as set forth in claim 51, wherein act (c) comprises the act of:

delivering a stop clock signal to the processor coupled to the identified bus.

54. The method, as set forth in claim 51, wherein act (c) comprises the act of:

notifying an operating system of the computer to reschedule the processes on the identified bus.

55. The method, as set forth in claim 51, wherein act (c) comprises the acts of:

determining whether the processor coupled to the identified bus includes a write back cache; and flushing the write back cache.

56. The method, as set forth in claim 51, wherein act (d) comprises the act of:

placing the identified bus in a state of quiescence.

57. The method, as set forth in claim 56, wherein the act of placing the identified bus in a state of quiescence comprises the act of:

disconnecting $V_{term}$ from the identified bus.

58. The method, as set forth in claim 51, wherein act (e) comprises the act of:

shutting off a voltage regulator module associated with the processor.

59. The method, as set forth in claim 51, wherein act (f) comprises the act of:

illuminating an LED located near each processor to be removed or replaced.

60. The method, as set forth in claim 51, wherein act (g) comprises the act of:

resetting the identified bus.

61. The method, as set forth in claim 51, wherein act (g) comprises the act of:

notifying an operating system of the computer of available processors coupled to the buses.

62. The method, as set forth in claim 51, wherein acts (a) through (g) are performed in order.

* * * * *